United States Patent [19]
Rehrig

[11] Patent Number: 4,720,115
[45] Date of Patent: Jan. 19, 1988

[54] PLASTIC DOLLY

[76] Inventor: Houston Rehrig, 505 S. Orange Grove, Apt. 11, Pasadena, Calif. 91105

[21] Appl. No.: 858,671

[22] Filed: May 2, 1986

[51] Int. Cl.$^4$ .............................. B62B 3/02; A47B 9/00
[52] U.S. Cl. .............................. 280/79.1 R; 108/56.1; 108/901; 403/408.1
[58] Field of Search ............ 280/79.1 R, 79.3, 79.1 A, 280/47.34; 108/901, 902, 53.5, 53.4, 56.1, 51.1; 403/231, 382, 403, 408.1

[56] References Cited

U.S. PATENT DOCUMENTS

| | | | |
|---|---|---|---|
| 2,610,750 | 9/1952 | Hulbert | 280/33.99 T |
| 3,582,102 | 6/1971 | Bewick | 280/33.99 T |
| 3,902,692 | 9/1975 | Skinner | 108/901 |
| 3,964,762 | 6/1976 | Adams | 280/79.1 |
| 4,077,644 | 3/1978 | Roby | 280/79.1 R |
| 4,316,419 | 2/1982 | Cupido | 108/901 |
| 4,577,448 | 3/1986 | Howorth | 403/408.1 |

OTHER PUBLICATIONS

"Wood Dolly Trucks", The Colson Corp. catalog No. L-292, 1945.

Primary Examiner—David M. Mitchell
Attorney, Agent, or Firm—Banner, Birch McKie & Beckett

[57] ABSTRACT

The present invention relates to a plastic dolly having a pair of longitudinal side members and a pair of transverse end members coupled together by lap joints to form a frame, preferably a rectangle. The various members are molded in a honeycomb/cellular configuration to conserve product weight and materials. Each of the four corner joints includes a caster fastening hole for receiving a caster fastening bolt which securely fastens the joints together and carries a dolly caster wheel. Additional strength and rigidity is provided to the dolly by two long, preferably metal, reinforcement elements disposed in grooves running longitudinally in the side members and extending into the end members.

6 Claims, 14 Drawing Figures

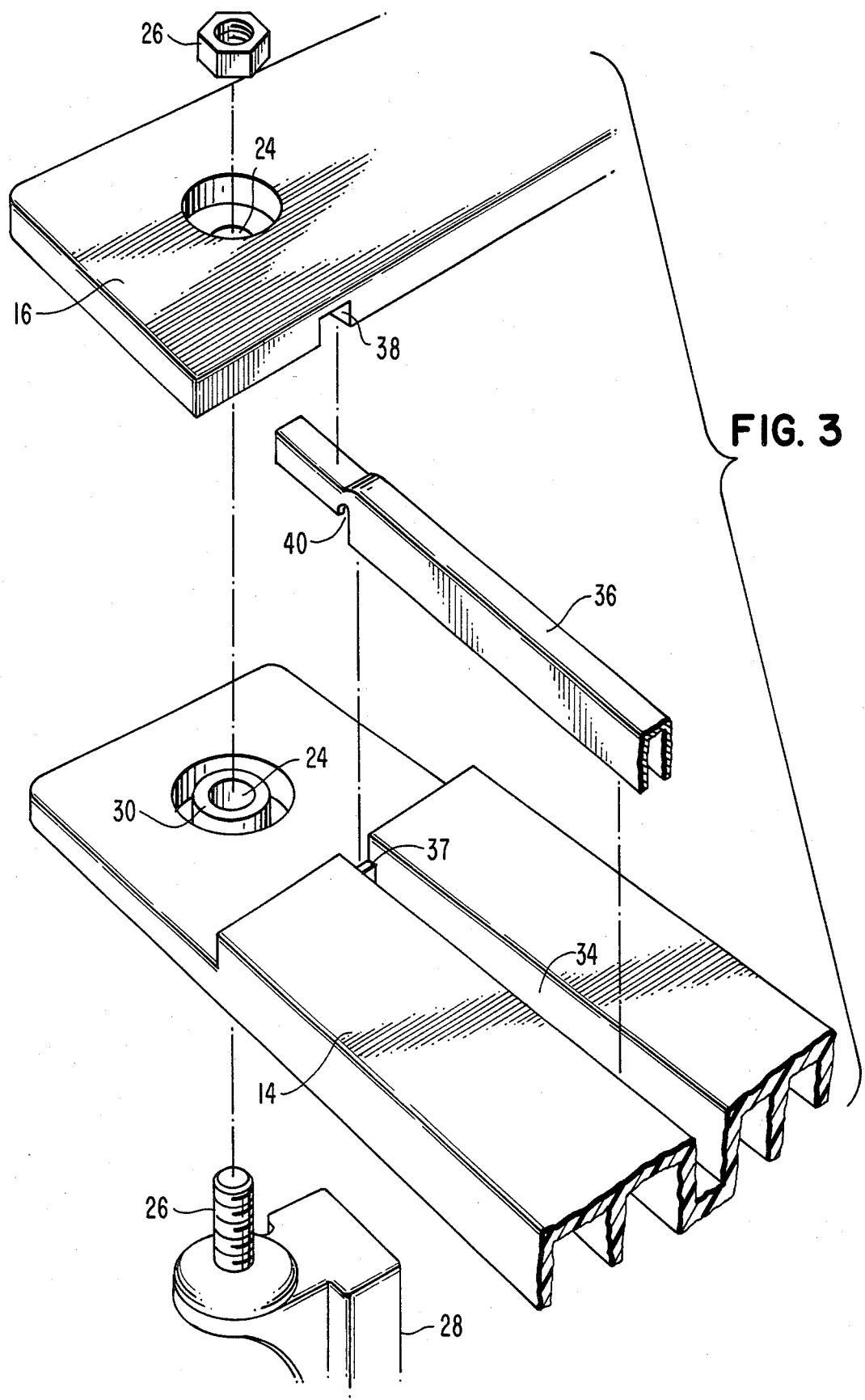

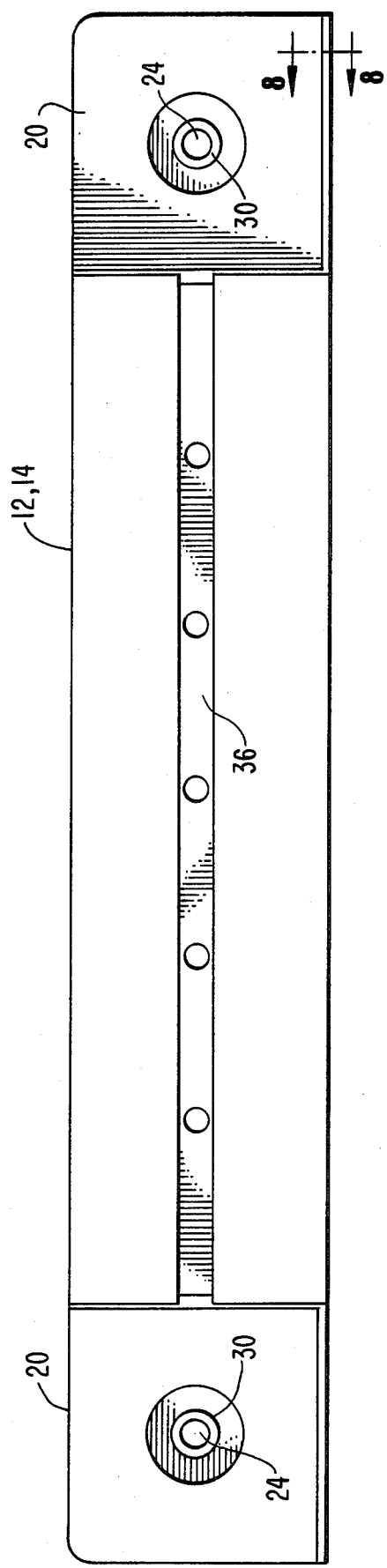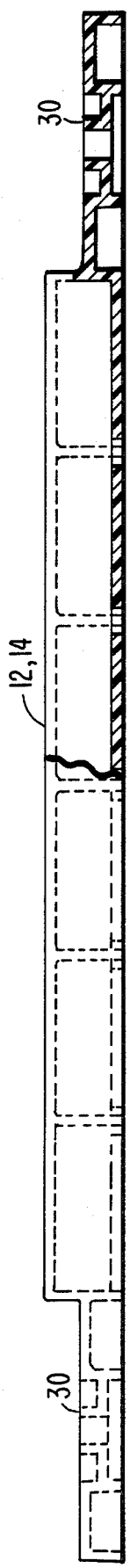

PLASTIC DOLLY

BACKGROUND OF THE INVENTION

Typically, dollies are made of relatively heavy, solid wood rectangles or wood slats with a caster fastened on the underside of each corner. These prior art dollies use, for example, metal corner plates or anchoring plates to add strength to the dolly frame, such as disclosed in U.S. Pat. Nos. 1,184,079 to D'Arcy and 2,414,277 to Shepard, Jr. et al. However, these plates are insufficient, in that they only provide reinforcement to a limited area, that is, only at the corners of the dolly. Another disadvantage to this construction is that the dolly caster is typically fastened with four bolts in order to maintain the rigidity of the dolly frame. Since all the bolts must be removed in order to disassemble the dolly, any repair or replacement of a worn element is a time consuming job.

U.S. Pat. Nos. 4,060,252 to Mowery and 4,103,857 to Levenhagen both disclose one-piece plastic transfer devices. Mowery shows a plastic dolly with plastic strengthening ribs formed on the underside of the dolly. Levenhagen discloses a one-piece plastic pallet having a steel rod for reinforcing the perimeter of the pallet. The primary disadvantage to these device is that they are expensive to use since the entire device must be scrapped even if only a portion of it is damaged.

SUMMARY OF THE INVENTION

It is an object of the present invention to provide a plastic dolly with reinforcement elements along substantially the entire length of the side member to add strength and rigidity.

It is a further object of the present invention to provide a plastic dolly with elements which may be easily disassembled for repair or replacement.

It is a further object of the present invention to provide a plastic dolly which requires only one caster bolt per caster to fascilitate ease of assembly and disassembly.

The present invention is directed to a plastic dolly of lightweight, yet durable, construction preferably including a pair of longitudinal side members and a pair of transverse end members coupled by lap joints to form a frame, preferably rectangular in shape. The various members are molded in a honeycomb/cellular configuration to converse product weight and materials. The end portions of each of the members may be rabbeted so that the corner joints are of aproximately equal thickness as the side and end members. Each of the four corner joints includes a caster fastening hole for receiving a caster fastening bolt which securely fastens the joints together and carries a conventional dolly caster wheel. Additional strength and rigidity is provided to at least one of the side members and to the lap joints by a long, preferably metal, reinforcement element. The reinforcement element is disposed in a long groove which extends substantially along the length of the longitudinal side member and into a smaller groove which extends radially from the caster fastening hole in the corresponding end of the transverse end member. The coupling of the reinforcement element between the end portion of one transverse element, along the longitudinal groove, to the end portion of the other transverse member provides a key-like fit for the metal reinforcement. This design exhibits high strength, rigidity and durability while being lightweight and permitting easy repair or replacement of the dolly elements.

BRIEF DESCRIPTION OF THE DRAWINGS

FIG. 3 is an exploded view of the lap joint of FIG. 1;

FIG. 4 is a top view of the side member illustrated in FIG. 1;

FIG. 5 is a side view, partially in cross-section, of the side member illustrated in FIG. 4;

DETAILED DESCRIPTION OF THE PREFERRED EMBODIMENTS

Figure 1:
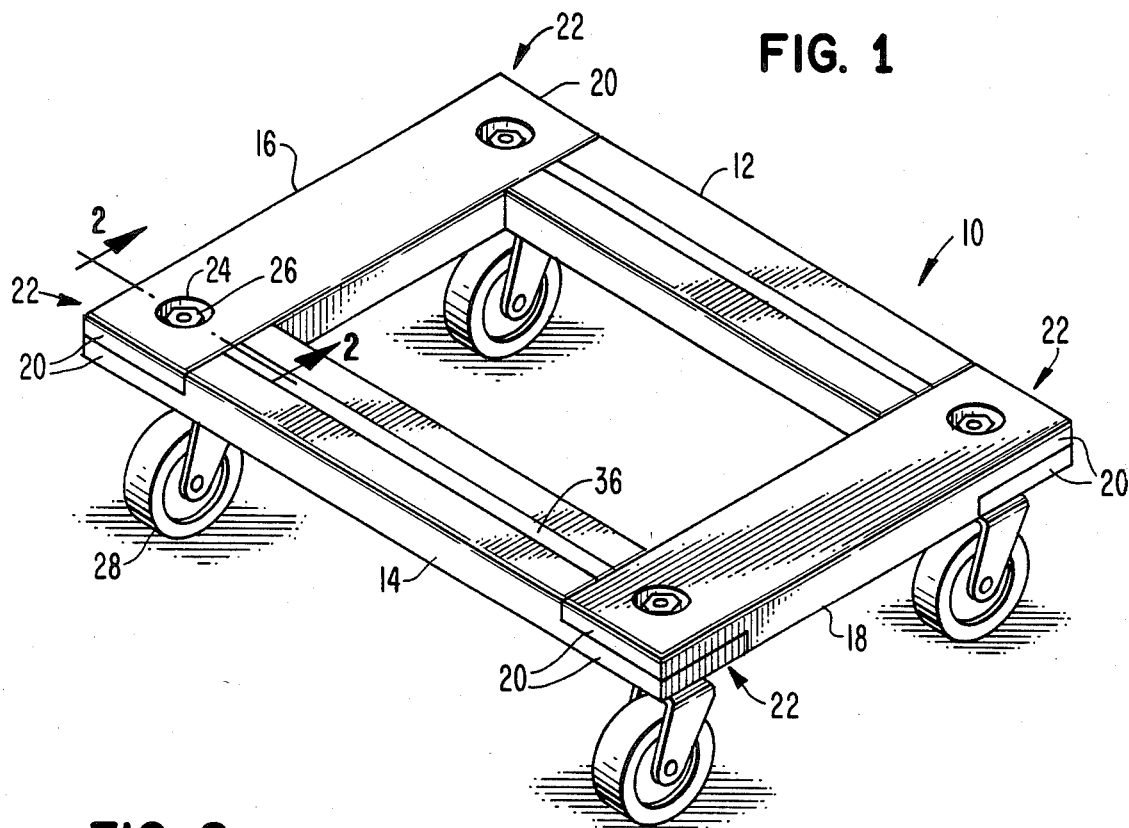
FIG. 1 is an isometric view of a plastic dolly in accordance with the present invention.
Figure 2:
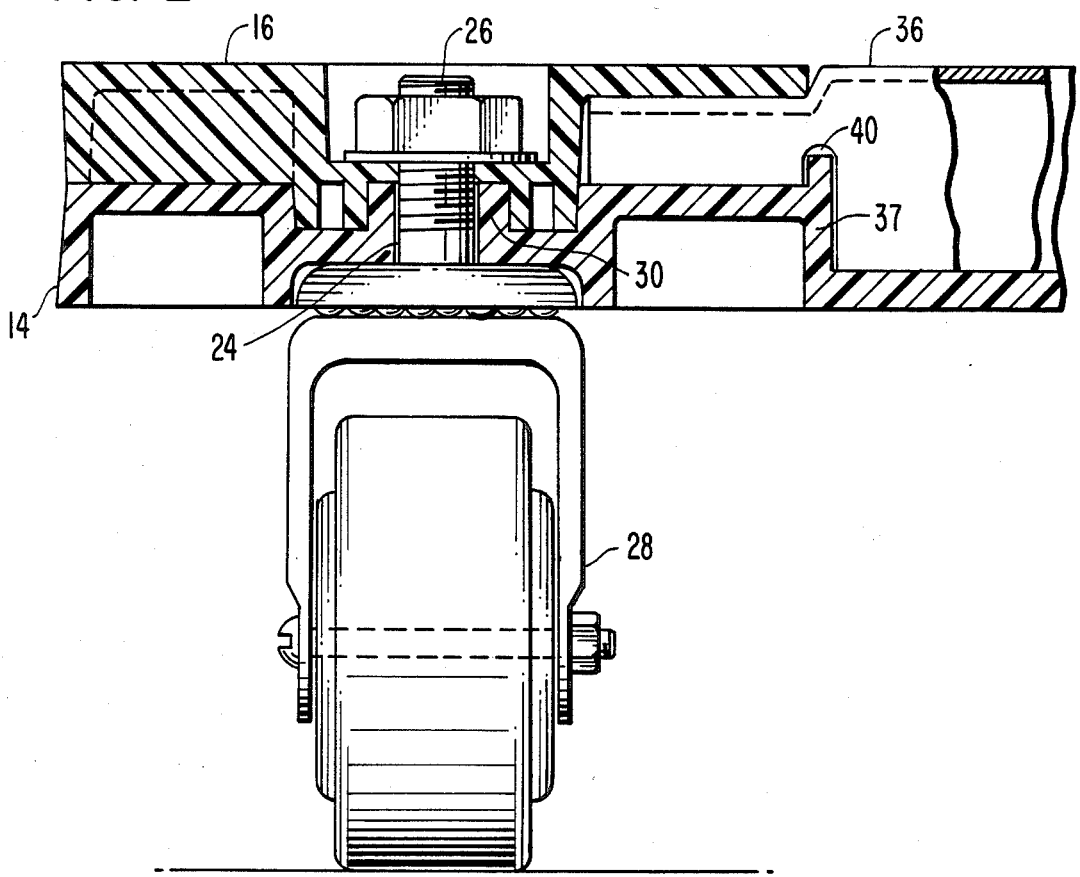
FIG. 2 is a cross-sectional view, taken generally along line 2—2 of FIG. 1, illustrating the lap joint of FIG. 1.
Figure 6:
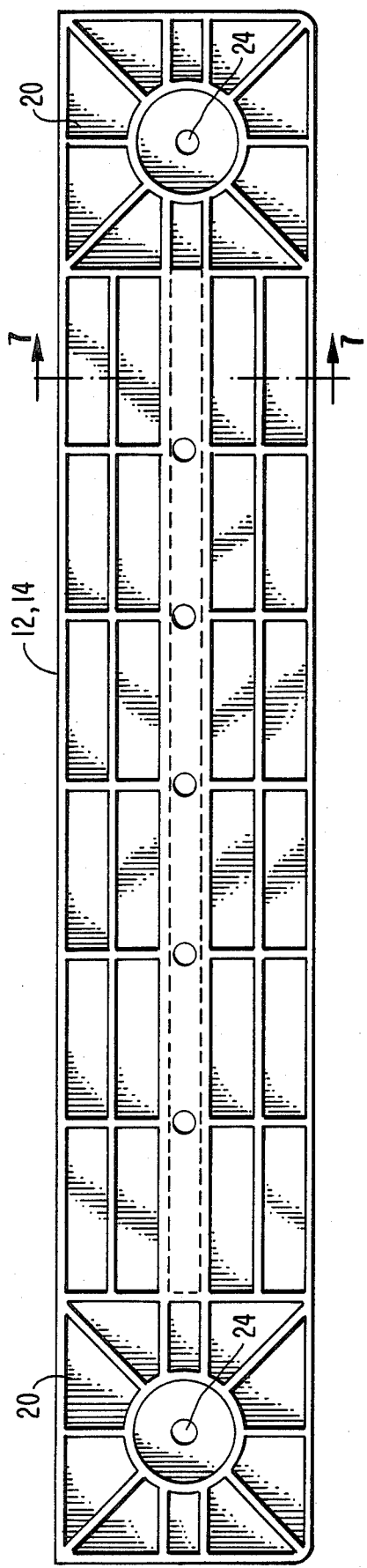
FIG. 6 is a bottom view of the side member illustrated in FIG. 4.

A preferred embodiment of a palstic dolly in accordance with the present invention is illustrated in FIG. 1 and generally designated 10. Dolly 10 includes longitudinal side members 12, 14, illustrated in FIGS. 4-8, and transverse end members 16, 18, illustrated in FIGS. 9-13, coupled to form a frame, preferably rectangular in shape. Of course, other numbers of side members could be used to produce dollies of other shapes. End portions 20 of members 12, 14, 16, 18 are coupled to form a lap joint, illustrated in FIG. 1 and generally designated 22. The end portions are preferably rabbeted so that the thickness of lap joint 22 is approximately the same as the thickness of members 12, 14, 16, 18. The members 12, 14, 16, 18 may all be molded in a honeycomb/cellular configurations so as to conserve product weight and materials.

Each of the four corner lap joints 22 include caster fastening hole 24 for receiving caster bolt 26 which securely fastens the corner joints together. Each caster bolt 26 carries its respective dolly caster wheel 28. This construction permits the disassembly of the entire dolly upon the removal of only four bolts, thus permitting easy repair or replacement of any of the dolly elements.

To provide additional strength to the lap joint, it is contemplated that raised annular flange 30 be formed in the upper surface of each end portion 20 of side members 12, 14, surrounding caster fastening hole 24. Circular indentation 32 is formed on the lower surface of each end portion 20 of end members 16, 18 surrounding their caster fastening holes. Flange 30 and indentation 32 are shaped such that each flange 30 fits snugly within its respective indentation 32 when the lap joints are fit together. Caster fastening bolt 26 runs through both flange 30 and indentation 32, thus providing increased strength and rigidity for the lap joints.

Figure 8:
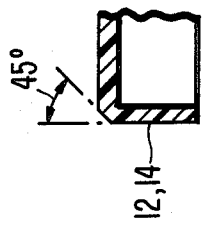
FIG. 8 is an exploded cross-sectional view, taken generally along line 8—8 of FIG. 4, showing the beveled edge of the side member.
Figure 7:
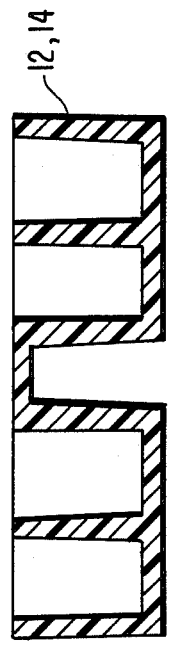
FIG. 7 is a cross-sectional view, taken generally along line 7—7 of FIG. 6, illustrating the honeycomb-/cellular configuration of the side member.
Figure 9:
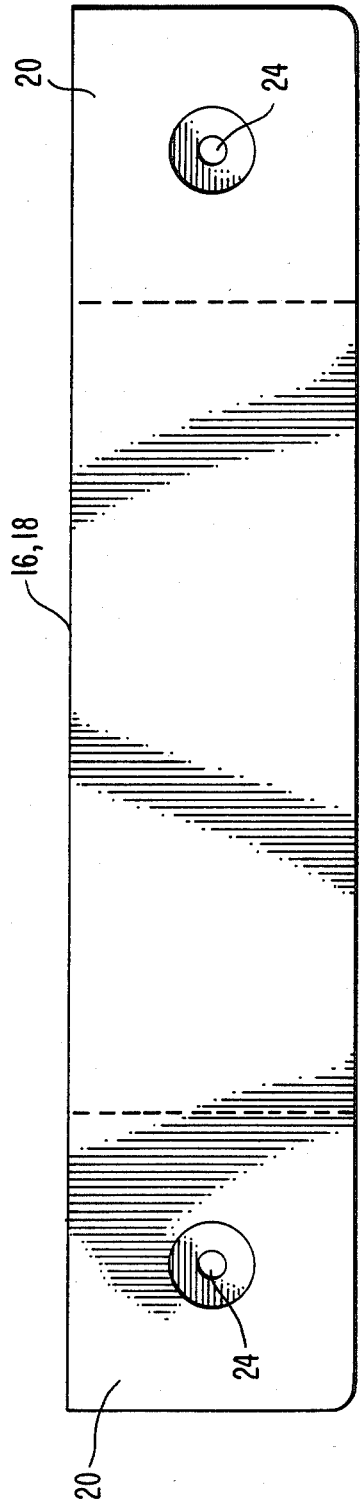
FIG. 9 is a top view of the end member illustrated in FIG. 1.
Figure 14:
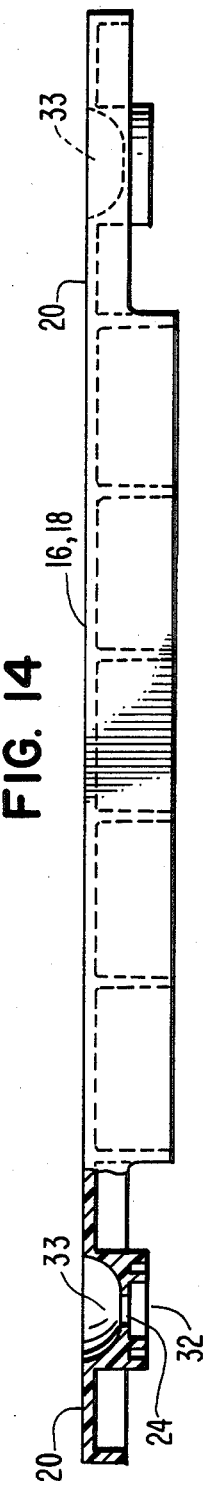
FIG. 14 is a side view of the end member, partially in cross-section, illustrated in FIG. 9 showing the rounded recess for accomodating stacked dolly caster wheels.
Figure 10:
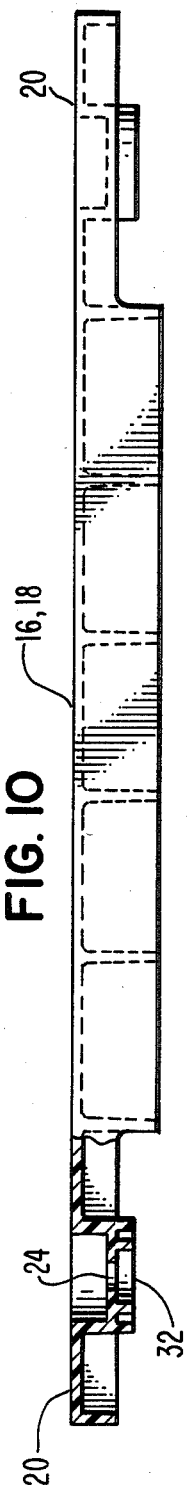
FIG. 10 is a side view, partially in cross-section, of the end member illustrated in FIG. 9.
Figure 11:
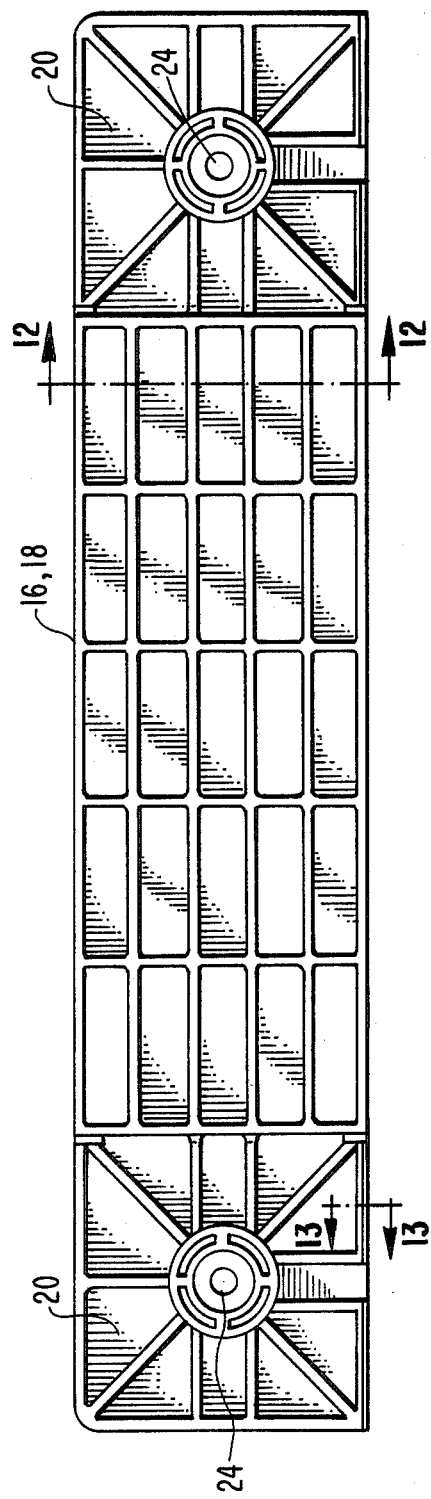
FIG. 11 is a bottom view of the end member illustrated in FIG. 9.
Figure 13:
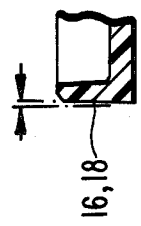
FIG. 13 is an exploded cross-sectional view, taken generally along line 13—13 of FIG. 11, showing the beveled edge of the end member.
Figure 12:
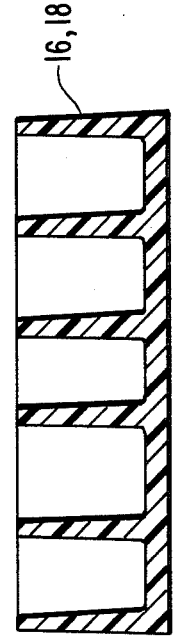
FIG. 12 is a cross-sectional view, taken generally along line 12—12 of FIG. 11, of the end member showing the honeycomb/cellular configuration.

Side and end members 12, 14, 16, 18 may include recesses 33 formed in the upper surface of the members, as illustrated in FIG. 14. Recess 33 is shaped to accomodate a caster wheel, i.e., preferably rounded, so that the dollies may be conveniently stacked for storage, etc., without having one dolly roll of the dolly beneath it. Side and end members may also have a beveled edge as illustrated in FIGS. 8 and 13.

A long groove 34 extends longitudinally along substantially the entire length of the upper surface of at least one of the side members 12, 14. Long groove 34 accomodates a reinforcement element 36 fit snugly therewithin. Reinforcement element 36 is preferably metal, although it is contemplated that other materials may be used. It is further contemplated, that in situations wherein the reinforcement element may be subject to rust or corrosion, the long grooves may be formed in the lower surface of the side members to protect the reinforcement element.

A shorter groove 38 is formed in the underside of at least one of the end portions 20 of each end member 16, 18. Groove 38 extends radially outwardly from each caster fastening hole and aligns with its respective long groove 34. The ends of the reinforcement element fits within the corresponding shorter grooves to couple each reinforcement element between the lap joint of one end member, along the long groove, to the lap joint of the other end member to provide a key-like fit for the reinforcement element. Reinforcement element 36 may also have cut-out portion 40 formed in each end to fascilitate a snug fit by fitting over a rib 37 at the end of long groove 34.

To assemble the plastic dolly in accordance with the present invention, as best seen in FIG. 3, the reinforcement element is placed within the long groove in the side member. If a second reinforcement element is used, it is placed within a long groove in the other side member. The side members and the end members are fit together to form a frame. A caster fastening bolt is then inserted into the caster fastening hole at each corner of the frame, a caster is fixed to the end of each belt, and the bolt is tightened.

The foregoing description is for illustrative purposes only. It is contemplated that the invention may be modified, particularly with regard to matters of shape size and arrangement of parts, within the scope of the invention as defined by the broad, general terms in which the appended claims are expressed. For example, it is contemplated that each member could be rabbeted on the upper surface at one end and on the lower surface at the other end, so that each member could be interchanged and used as either a side member or an end member. For another example, it is also contemplated that the reinforcement elements be formed of a strong, rigid plastic material, instead of metal.

I claim:

1. A plastic dolly, said dolly comprising:
   a pair of longitudinal side members and a pair of transverse end members coupled to form a frame, said side members being formed in a honeycomb-/cellular configuration;
   each of said side members and said end members having end portions, said end portions interfitting to form a lap joint coupling said side members and said end members at each corner of the frame;
   a caster fastening hole formed in each of said end members for receiving a caster fastening bolt which securely fastens each of said lap joints together and carries a dolly caster wheel; and
   reinforcement means coupled to at least one of said side members for reinforcing said side member, wherein said reinforcement means is disposed in a long groove, said long groove being formed longitudinally in one of said side members, and extending substantially along the length of said side member, and in a short groove formed in each of said corresponding end portions of said end members and extending radially outwardly from said caster fastening hole to align with the said long groove, wherein the ends of said reinforcement means fit within said short grooves so as to couple said reinforcement means between the lap joint of one said end member, along said long groove, to the corresponding lap joint of the other of said end members.

2. A plastic dolly as in claim 1 wherein said long groove is formed on the upper surface of said side member and said short groove is formed on the lower surface of said end members.

3. A plastic dolly as in claim 1 further comprising:
   a raised annular flange formed on the upper surface of said end portions of said side members, surrounding said caster fastening holes; and
   a circular indentation formed on the lower surface of said end portions of said end members, surrounding said caster fastening holes, each of said flanges fitting snugly within its corresponding indentation when said lap joints are fit together, thus providing increased strength and ridigity to said laped joints.

4. A plastic dolly as in claim 1 wherein said long groove is formed on the lower surface of said side members and said short groove is formed on the upper surface of said end members.

5. A plastic dolly, said dolly comprising:
   a pair of longitudinal side members and a pair of transverse end members coupled to form a frame, said members being formed in a honeycomb/cellular configuration;
   each of said side members and said end member having end portions, said end portions interfitting to form a lap joint coupling said side members and said end members at each corner of the frame;
   a caster fastening hole formed at each of said end portions for receiving a caster bolt which securely fasten each of said lap joints together and carriers a dolly caster wheel;
   reinforcement means coupled to at least one of said side members for reinforcing said side member, wherein said reinforcement means is disposed in a long groove, said long groove being formed longitudinally in one of said side members, and extending substantially along the length of side member, and in a short groove formed in each of said corresponding end portions of said end members and extending radially outwardly from said caster fastening hole to align with said long groove, wherein the ends of said reinforcement means fit within said short grooves so as to couple said reinforcement means between the lap joint of one said end member, along said long groove, to the corresponding lap joint of the other of said end members; and second reinforcement means coupled to said other side member for reinforcing said other side member, said second long groove being formed longitudinally in the said other side member and extending substantially along the length of said other side member, and in a second short groove formed in each of said corresponding end portions of said end members and extending radially outwardly from said caster fastening hole to align with said second long groove, wherein the ends of said second reinforcement means fit within said second short grooves so as to couple said second reinforcement means between the lap joint of one of said end members along said second long groove, to the corresponding lap joint of the other of said end members.

6. A plastic dolly, said dolly comprising:

a pair of longitudinal side members and a pair of transverse end members coupled to form a frame, said side members being formed in a honeycomb-/cellular configuration;

each of said side members and said end members having end portions, said end portions interfitting to form a lap joint coupling said side members and said end members at each corner of the frame;

a caster fastening hole formed in each of said end members for receiving a caster fastening bolt which securely fastens each of said lap joints together and carries a dolly caster wheel; and reinforcement means coupled to at least one of said side members for reinforcing said side member, wherein said reinforcement means is disposed in a long groove, said long groove being formed longitudinally in one of said side members, and extending substantially along the length of said side member, and in a short groove formed in at least one of said corresponding end portions of said end members and extending radially outwardly from said caster fastening hole to align with the said long groove, wherein the ends of said reinforcement means fit within said short grooves so as to couple said reinforcement means between the lap joint of one said end member, along said long groove, to the corresponding lap joint of the other of said end members.

* * * * *